3,682,617
METHOD OF COMBATING UNWANTED VEGETATION

William Carter Doyle, Jr., Leawood, Kans., assignor to Gulf Research & Development Company, Pittsburgh, Pa.
No Drawing. Filed May 7, 1970, Ser. No. 35,556
Int. Cl. A01n 9/22
U.S. Cl. 71—94                    6 Claims

---

ABSTRACT OF THE DISCLOSURE

Unwanted vegetation, particularly pigweed and noxious grasses is combated in the presence of various crops including tomatoes, peanuts, corn and soybeans by applying to the locus of the unwanted vegetation an effective amount of 1-methyl-4-(4-pyridyl)pyridinium halide. The monopyridinium halides derived from 4,4'-bipyridine are disclosed to possess greater utility as selective herbicides than the corresponding bispyridinium halides.

---

DESCRIPTION OF THE INVENTION

The bisquaternary salts of 4,4'-bipyridine are known to be compounds which are extremely phytotoxic. These compounds have been used to some extent in combating unwanted vegetation, but their utility is severely limited by a lack of selectivity. The bisquaternary herbicides such as paraquat are frequently manufactured by a method in which the monoquaternary salt is made first and then is converted to the bisquaternary. The bispyridinium salts and methods of synthesis thereof have been disclosed in many patents, for example, French Patents 1,357,238 and 1,356,546, French patent of addition 84,655, also South African Patent 64/1,720, British Patent 999,585, British Patent 813,532 and German Patent 1,048,070. The monoquaternary salts derived from 4,4'-bipyridine have been know for many years prior to the publication of the aforementioned patents. For example, the preparation of the 1-methyl iodide is described in Berichte, 56B, pp. 83–91 (1923). Apparently the more useful, more selective phytotoxic activity of the monoquaternary salts has not previously been recognized.

I have discovered that the 4-(4-pyridyl) substituted methylpyridinium iodide, bromide and chloride may be used to selectively combat weeds or other unwanted vegetation in the presence of valuable crops such as tomatoes, peanuts, corn and soybeans with negligible effect on the crop plants. The use of the compounds as selective herbicides is illustrated in the discussion which follows.

Twenty-three species of plants were planted in 2½ inch square fertilizer-impregnated paper containers in a greenhouse. After the plants had emerged and grown to a height of 2 to 6 inches a portion of the plants were sprayed with an aqueous spray mixture made by adding emulsifier to the active ingredient and diluting with water, employing application rates of both 2 lb. per acre and 1 lb. per acre. After about 15 days the effect of the herbicide on the plants was evaluated by a comparison with a group of plants which had been grown under essentially the same conditions but had had only water applied to them instead of the spray mixture containing herbicide. The results were rated according to the following schedule:

4—all plants died
3—severe injury to all plants, some died
2—all plants injured, some died
1—observable injury to some plants, complete recovery probable
0—no observable effect The results are tabulated below. Results of a similar test with paraquat at only 2 oz. per acre are included for purposes of comparison.

EFFECT OF PYRIDYL METHYLPYRIDINIUM HALIDES

|  | 2 lbs./acre | | | 1 lb./acre | | | 2 oz./acre, paraquat |
|---|---|---|---|---|---|---|---|
|  | Iodide | Bromide | Chloride | Iodide | Bromide | Chloride |  |
| Pigweed | 4 | 4 | 4 | 4 | 4 | 4 | 4 |
| Lambsquarters | 4 | 3 | 4 | 3 | 4 | 4 | 4 |
| Crabgrass | 4 | 4 | 4 | 4 | 4 | 4 | 4 |
| Downy Brome | 4 | 4 | 4 | 4 | 4 | 4 | 4 |
| Giant foxtail | 4 | 4 | 4 | 4 | 4 | 4 | 4 |
| Tomato | 3 | 4 | 2 | 2 | 1 | 1 | 3 |
| Wild buckwheat | 2 | 2 | 2 | 2 | 2 | 2 | 2 |
| Barnyard grass | 4 | 4 | 4 | 4 | 4 | 4 | 4 |
| Cotton | 4 | 4 | 3 | 2 | 3 | 2 | 4 |
| Peanuts | 1 | 0 | 0 | 0 | 0 | 0 | 2 |
| Corn (Zea mays) | 3 | 1 | 2 | 1 | 1 | 1 | 4 |
| Soybean | 1 | 1 | 1 | 1 | 0 | 1 | 3 |
| Wheat | 4 | 4 | 4 | 3 | 4 | 2 | 4 |
| Wild oats | 4 | 4 | 3 | 3 | 3 | 1 | 4 |
| Alfalfa | 4 | 3 | 3 | 4 | 2 | 3 | 4 |
| Shattercane | 3 | 3 | 3 | 3 | 2 | 4 | 4 |
| Morning glory | 2 | 4 | 1 | 2 | 2 | 1 | 4 |
| Green foxtail | 4 | 4 | 4 | 4 | 4 | 4 | 4 |
| Wild mustard | 4 | 3 | 1 | 3 | 1 | 0 | 4 |
| Grain sorghum | 3 | 3 | 2 | 3 | 1 | 3 | 3 |
| Rice | 4 | 4 | 3 | 2 | 2 | 3 | 4 |
| Sugar beet | 4 | 4 | 4 | 4 | 4 | 4 | 4 |
| Nutsedge | 1 | 2 | 2 |  | 1 | 3 | 3 |

In the above table it will be seen that the bromide and chloride salts in particular may be used even in a crop which is as susceptible to injury and as valuable as tomatoes, without substantial injury to the crop but at the same time give complete control of pigweed and the noxious grasses. All of the monoquaternary salts may be used to control weeds in peanuts and soybeans and at lower rates of application also in corn. These useful selectively phytotoxic characteristics are not possessed by the bisquaternary compounds, even at very low applications, as indicated by the comparative data obtained with paraquat. Apparently in the past the monoquaternary has merely been used to synthesize the bisquaternary and the utility of the intermediate as a more selective herbicide has not been recognized. The use of the monoquaternary bromide or chloride is preferred, particularly since these compounds are more cheaply and easily manufactured than the iodide.

I claim:

1. The method of combating unwanted vegetation in crops, comprising applying to the locus of the unwanted vegetation an effective amount of a 1-methyl-4-(4- pyridyl) pyridinium halide selected from the group consisting of the iodide, bromide and chloride.

2. The method of combating unwanted vegetation in tomatoes comprising applying to the locus of the unwanted vegetation an effective amount of 1-methyl-4-(4-pyridyl) pyridinium chloride.

3. The method of combating unwanted vegetation in soybeans comprising applying to the locus of the unwanted vegetation an effective amount of 1-methyl-4-(4-pyridyl) pyridinium bromide.

4. The method of combating unwanted vegetation in corn comprising applying to the locus of the unwanted vegetation an effective amount of 1-methyl-4-(4-pyridyl) pyridinium bromide.

5. The method of combating unwanted vegetation in peanuts comprising applying to the locus of the unwanted vegetation an effective amount of 1-methyl-4-(4-pyridyl) pyridinium bromide.

6. The method of combating unwanted vegetation in peanuts comprising applying to the locus of the unwanted vegetation an effective amount of 1-methyl-4-(4-pyridyl) pyridinium chloride.

References Cited

UNITED STATES PATENTS 2,972,528    5/1961    Brian et al. _____ 71—94

FOREIGN PATENTS 1,108,174    4/1968    Great Britain _____ 71—94

LEWIS GOTTS, Primary Examiner

C. L. MILLS, Assistant Examiner